US011859062B2

(12) United States Patent
Kalbe et al.

(10) Patent No.: US 11,859,062 B2
(45) Date of Patent: Jan. 2, 2024

(54) METHOD FOR PRODUCING A THERMODEFORMABLE POLYMER/FIBER COMPOSITE

(71) Applicant: BASF SE, Ludwigshafen am Rhein (DE)

(72) Inventors: Michael Kalbe, Ludwigshafen am Rhein (DE); Mirko Flory, Ludwigshafen am Rhein (DE); Rainer Scheidhauer, Ludwigshafen am Rhein (DE); Hans Horler, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 345 days.

(21) Appl. No.: 17/267,662

(22) PCT Filed: Jun. 12, 2019

(86) PCT No.: PCT/EP2019/065309
§ 371 (c)(1),
(2) Date: Feb. 10, 2021

(87) PCT Pub. No.: WO2020/030330
PCT Pub. Date: Feb. 13, 2020

(65) Prior Publication Data
US 2021/0324154 A1 Oct. 21, 2021

(30) Foreign Application Priority Data
Aug. 10, 2018 (EP) ..................................... 18188499

(51) Int. Cl.
| | | |
|---|---|---|
| C08J 5/04 | (2006.01) | |
| B29C 51/12 | (2006.01) | |
| B29C 51/22 | (2006.01) | |
| B29C 51/26 | (2006.01) | |
| B29C 70/06 | (2006.01) | |
| B29C 70/50 | (2006.01) | |
| C08G 18/62 | (2006.01) | |
| C08G 18/70 | (2006.01) | |
| C08G 18/76 | (2006.01) | |
| C08J 5/06 | (2006.01) | |
| C08J 5/10 | (2006.01) | |
| B29C 70/12 | (2006.01) | |
| B29C 51/46 | (2006.01) | |
| B29K 75/00 | (2006.01) | |
| B29K 105/12 | (2006.01) | |

(52) U.S. Cl.
CPC .............. *C08J 5/045* (2013.01); *B29C 51/12* (2013.01); *B29C 51/22* (2013.01); *B29C 51/264* (2013.01); *B29C 51/266* (2013.01); *B29C 70/06* (2013.01); *B29C 70/12* (2013.01); *B29C 70/50* (2013.01); *C08G 18/622* (2013.01); *C08G 18/6237* (2013.01); *C08G 18/6254* (2013.01); *C08G 18/706* (2013.01); *C08G 18/7664* (2013.01); *C08G 18/7671* (2013.01); *C08J 5/06* (2013.01); *C08J 5/10* (2013.01); *B29C 51/46* (2013.01); *B29K 2075/00* (2013.01); *B29K 2105/12* (2013.01); *C08J 2375/04* (2013.01); *C08J 2375/06* (2013.01); *C08J 2433/06* (2013.01)

(58) Field of Classification Search
CPC ....... B29C 51/12; B29C 51/22; B29C 51/264; B29C 51/266; B29C 51/46; B29C 70/06; B29C 70/50; B29C 70/12; B29K 2075/00; B29K 2105/12; C08G 18/622; C08G 18/6237; C08G 18/6254; C08G 18/706; C08G 18/7664; C08G 18/7671; C08J 5/045; C08J 5/06; C08J 5/10; C08J 2375/06; C08J 2375/04; C08J 2433/06
See application file for complete search history.

(56) References Cited

U.S. PATENT DOCUMENTS

| | | | |
|---|---|---|---|
| 4,269,749 A | 5/1981 | Marriott et al. | |
| 5,350,787 A | 9/1994 | Aydin et al. | |
| 5,401,582 A | 3/1995 | Weyland et al. | |
| 6,096,858 A | 8/2000 | Dobbelaar et al. | |
| 2011/0171473 A1* | 7/2011 | Kasmayr | B32B 5/22 156/60 |
| 2011/0189473 A1 | 8/2011 | Mente | |
| 2021/0189655 A1* | 6/2021 | Kalbe | D21H 17/37 |

FOREIGN PATENT DOCUMENTS

| | | |
|---|---|---|
| CN | 102165015 A | 8/2011 |
| DE | 4003422 A1 | 8/1991 |
| DE | 4213965 A1 | 11/1993 |
| DE | 19624299 A1 | 1/1997 |
| DE | 19621027 A1 | 11/1997 |
| DE | 19741184 A1 | 3/1999 |

(Continued)

OTHER PUBLICATIONS

International Preliminary Report on Patentability received for PCT Patent Application No. PCT/EP2019/065309, dated Feb. 25, 2021, 19 pages (11 pages of English Translation and 8 pages of Original Document).

(Continued)

*Primary Examiner* — Patrick D Niland

(74) *Attorney, Agent, or Firm* — Faegre Drinker Biddle & Reath LLP

(57) ABSTRACT

A process for producing a thermoformable polymer/fiber composite using a fibrous substrate, an organic di- or polyisocyanate compound and a dispersion polymer.

17 Claims, No Drawings

(56) References Cited

FOREIGN PATENT DOCUMENTS

| | | |
|---|---|---|
| DE | 19741187 A1 | 3/1999 |
| DE | 19805122 A1 | 4/1999 |
| DE | 19828183 A1 | 12/1999 |
| DE | 19839199 A1 | 3/2000 |
| DE | 19840586 A1 | 3/2000 |
| DE | 19847115 C1 | 5/2000 |
| DE | 10013186 A1 | 9/2001 |
| DE | 10013187 A1 | 10/2001 |
| EP | 0040419 A2 | 11/1981 |
| EP | 0567812 A1 | 11/1993 |
| EP | 0614922 A2 | 9/1994 |
| EP | 0771328 A1 | 5/1997 |
| EP | 1203647 A1 | 5/2002 |
| EP | 1789243 A1 | 5/2007 |
| EP | 2172333 A1 | 4/2010 |
| EP | 2301344 A1 | 3/2011 |
| WO | 95/33775 A1 | 12/1995 |
| WO | 2006/002015 A1 | 1/2006 |
| WO | 2007/073218 A1 | 6/2007 |
| WO | 2017/140520 A1 | 8/2017 |

OTHER PUBLICATIONS

International Search Report and Written Opinion received for PCT Patent Application No. PCT/EP2019/065309, dated Sep. 20, 2019, 22 pages (10 pages of English Translation and 12 pages of Original Document).

\* cited by examiner

METHOD FOR PRODUCING A THERMODEFORMABLE POLYMER/FIBER COMPOSITE

CROSS-REFERENCE TO RELATED APPLICATIONS

This application is a national stage application (under 35 U.S.C. § 371) of PCT/EP2019/065309, filed Jun. 12, 2019, which claims benefit of European Application No. 18188499.0, filed Aug. 10, 2018, both of which are incorporated herein by reference in their entirety.

The present invention provides a process for producing a thermoformable polymer/fiber composite using a fibrous substrate, an organic di- or polyisocyanate compound I and a polymer P, where the fibrous substrate is introduced into a gas stream, then
the fibrous substrate in the gas stream is contacted with an aqueous dispersion of a polymer P having a glass transition temperature Tg and an organic di- or polyisocyanate compound I, then
the fibrous substrate that has been contacted with the aqueous dispersion of the polymer P and the organic di- or polyisocyanate compound I is dried in the gas stream and then deposited, then
the deposited fibrous substrate obtained is converted to a fiber web, and then
the fiber web obtained is consolidated at a temperature ≥Tg to give a thermoformable polymer/fiber composite, which comprises effecting the aqueous dispersion of the polymer P by free-radically initiated emulsion polymerization of a mixture of ethylenically unsaturated monomers P [monomers P] in an aqueous medium in the presence of a polymer A, where the polymer A is formed from a) 80% to 100% by weight of at least one ethylenically unsaturated mono- and/or dicarboxylic acid [monomers A1] and
b) 0% to 20% by weight of at least one further ethylenically unsaturated monomer which differs from the monomers A1 [monomers A2], in copolymerized form, and where the monomers P are chosen in terms of type and amount such that the polymer P obtained has a glass transition temperature Tg≥20° C. measured according to DIN EN ISO 11357-2 (2013-09).

The present invention further provides the polymer/fiber composites themselves that are obtainable by the process of the invention and for the use thereof for production of polymer/fiber moldings, for example floor coverings, furniture moldings or wall decor parts.

Wood fiberboards are produced essentially proceeding from round timber, but also from woodchips or what are called slabs. After the round timber has been debarked, the round timber, just like the slabs, is comminuted in drum chippers to give woodchips. After contaminants such as sand or stones have been removed, the woodchips are first subjected to a hydrothermal pretreatment by means of steam in a preliminary steam vessel at 100° C. Thereafter, the presteamed woodchips are transferred to what is called the boiler, where they are exposed to a temperature of 140 to 180° C. and a pressure of 4 to 8 bar (gauge) in water for two to five minutes. Thereafter, the softened woodchips are transferred into what is called the refiner, where they are ground and at the same time defibrated, likewise at a pressure of 4 to 8 bar (gauge), between two fluted grinding disks that rotate relative to one another at a distance of about 3 to 0.1 mm. Subsequently, the aqueous wood fiber pulp obtained is transferred into what is called the blowline, a tube having a much lower pressure, the effect of which is that the water evaporates and thus serves as a gaseous transport medium for the wood fibers through the blowline (hydropneumatic conveying). By additional blowing of heated dry air into the blowline, the wood fibers are dried and transported onward pneumatically. In order to assure very substantially uniform application of the aqueous thermosetting binder required for production of the wood fiberboards, such as, in particular, formaldehyde resins such as urea/formaldehyde, phenol/formaldehyde, melamine/formaldehyde, melamine/urea/formaldehyde or melamine/phenol/formaldehyde resins, or isocyanates such as methylene diisocyanate or toluidine diisocyanate, to the fibers, the aqueous thermosetting binder is sprayed into the blowline at one or more sites prior to the blowing-in of the heated dry air. The "glued" fibers obtained after the drying are separated out and converted to a fiber web (fiber mat). This fiber mat is optionally compressed by means of a 'cold' preliminary compression and then pressed under pressure and at high temperature (150 to 230° C.) to give a wood-based material in slab form having a density of 250 to 1000 kg/m³. However, the use of thermosetting binders means that the wood fiberboards thus obtained are no longer thermoformable.

For production of thermoformable shaped bodies, especially wood fiberboards, WO 2007/73218 gives a quite general disclosure of the use of thermoplastic binders in liquid or particulate form. In this connection, aqueous binder dispersions are among those mentioned. However, thermoplastic binders disclosed are quite generally suitable polymers, and a multitude of completely different polymers are mentioned in an unspecific manner, for example acrylate polymers, urethane polymers, polyvinyl chloride, polystyrene, polyvinyl alcohol, polyamides, polyesters, but also starches and derivatives thereof, cellulose derivatives, proteins, polyacids, polyisocyanates, and also reactive resin systems such as epoxy resins, unsaturated polyesters, urethane/isocyanate resins or precondensates of a wide variety of different formaldehyde resins, etc. In the examples, pellets, fibers, powders or flakes of polypropylene, acid-modified polypropylene, polylactic acid fibers, polyvinyl alcohol, polyolefin copolymer dispersions, such as ethylene/acrylic acid or ethylene/maleic anhydride copolymer dispersions, are used without further specification.

An improved process for producing thermoformable moldings is described in WO 2017/140520, according to which an aqueous polymer dispersion obtainable via a specific aqueous emulsion polymerization is contacted with a fibrous substrate in a gas stream, advantageously in a blowline, then dried and compacted to give a thermoformable polymer/fiber composite which is then converted in parallel or in a downstream process step to a polymer/fiber molding. However, if these polymer/fiber moldings have sharp edges or have surfaces that are not smooth but embossed with a pattern, for example in accordance with a woodgrain or a geometric pattern, these sharp-edged and/or embossed polymer/fiber moldings are not always fully satisfactory in terms of their water resistance.

It was therefore an object of the present invention to provide a process for producing a thermoformable polymer/fiber composite from fibrous substrates and an aqueous dispersion of an effectively adhering polymer, from which the polymer/fiber molding produced has improved water resistance and advantageous embossability.

This object was surprisingly achieved by the process defined at the outset.

It is a characterizing feature of the process of the invention that a fibrous substrate is introduced into a gas stream. According to the invention, any fibrous substrates may be used. A fibrous substrate shall be understood here to mean those particles having a ratio of their longest dimension to their shortest dimension of at least ≥5, advantageously ≥10 and especially advantageously ≥50, and having a shortest dimension of ≤2 mm, advantageously ≥0.001 and ≤0.5 mm and especially advantageously ≥0.001 and ≤0.1 mm. It is essential that the shortest dimension is determined at an angle of 90° to the connecting line of the longest dimension of the particles.

The fibrous substrates may be natural fibers, such as vegetable, animal and mineral fibers, or synthetic fibers made from natural or synthetic polymers. Examples of vegetable fibers are cotton fibers, flax fibers, hemp fibers, kenaf fibers, jute fibers, wood fibers or sisal fibers, examples of animal fibers are wool or other animal hair, an example of mineral fibers is rockwool, an example of synthetic fibers of natural origin is viscose fibers, and examples of synthetic fibers based on synthetic polymers are polyester fibers such as polytrimethylene terephthalate, polyethylene naphthalate, polyethylene terephthalate or polybutylene terephthalate fibers, and the different polycarbonate fibers, polyolefin fibers such as, in particular, polyethylene or polypropylene fibers, polyamide fibers such as polycaprolactam fibers (nylon-6), polyamide fibers formed from hexamethylenediamine and adipic acid (nylon-6,6), polyamide fibers formed from hexamethylenediamine and terephthalic acid (nylon-6T), polyamide fibers formed from para-phenylenediamine and terephthalic acid (aramid), and also mineral fibers, such as glass fibers, carbon fibers or basalt fibers. Advantageously, however, the invention uses natural fibers, especially of vegetable origin and especially advantageously wood fibers as obtained from a refiner in particular.

In the context of the present invention, a gas stream shall be understood to mean the directed transport of a gaseous substance along a pressure gradient, for example in a vessel or in a tube. In principle, it is possible to use all substances which are gaseous under the transport conditions (especially pressure and temperature). For example, organic and/or inorganic solvent vapors are used, such as, especially advantageously, water vapor or nitrogenous gas mixtures such as air in particular. Advantageously in accordance with the invention, water vapor/air mixtures are used in a wide mixing ratio, as occur especially in wood fiber production by means of refiner and blowline.

According to the invention, the fibrous substrate in the gas stream is contacted with an aqueous dispersion of a polymer P having a glass transition temperature Tg and an organic di- or polyisocyanate compound I. If this contacting is effected in a blowline, advantageously via one or more injection nozzles, it should be ensured that the contacting with the aqueous dispersion of polymer P in the blowline is effected, in the flow direction, at one or more sites before the heated dry air for drying the wood fibers is blown in. Advantageously, the fibrous substrate, in the gas flow direction, by means of differently positioned nozzles, is contacted first with the aqueous dispersion of the polymer P and only then with the organic di- or polyisocyanate compound I. The fibrous substrate is particularly advantageously contacted here, in the gas flow direction, with the organic di- or polyisocyanate compound I in the last third and preferably in the last tenth of the blowline.

Subsequently, the fibrous substrate that has been contacted with the aqueous dispersion of the polymer P and the organic di- or polyisocyanate compound I is finish dried in the gas stream and then deposited. The drying of the fibrous substrate obtained is effected, for example, by removal and condensation of the water vapor or in a blowline by introduction of a sufficient amount of heated dry air that the relative air humidity in the resulting gas mixture is lowered to ≤10% or even ≤5%. This measure results in drying of the mixture of fibrous substrate, polymers P and organic di- or polyisocyanate compound I. In the context of this document, drying shall be understood to mean lowering of the residual moisture content of the resulting substrate/polymer/isocyanate mixture to ≤15% by weight and advantageously to ≤10% by weight, preferably to ≥5% and ≤10% by weight. In the context of this document, residual moisture content is understood to mean the percentage difference in weight, based on the substrate/polymer/isocyanate mixture used, which results when 1 g of substrate/polymer/isocyanate mixture is dried in a drying cabinet at 120° C. for one hour. The substrate/polymer/isocyanate mixture is separated out by the customary methods for separation of solids out of gas mixtures, for example by means of sieves or by exploitation of centrifugal forces via cyclone separators.

Subsequently, the separated-out substrate/polymer/isocyanate mixture obtained, in accordance with the invention, is converted to a fiber web, for example by appropriate scattering of the separated-out substrate/polymer/isocyanate mixture onto an area or, in continuous operation, onto a conveyor belt. This fiber web may, in accordance with the invention, optionally after mechanical pre-consolidation at a temperature well below the glass transition temperature Tg, have a thickness of ≥1 and ≤50 cm, advantageously ≥1 and ≤30 cm and especially advantageously ≥1 and ≤15 cm, and a density of ≥20 and ≤700 g/L, often ≥50 and ≤500 g/L and frequently ≥100 and ≤350 g/L. Subsequently, the fiber web thus obtained is consolidated at a temperature ≥Tg to give a thermoformable polymer/fiber composite. Consolidation here is understood to mean compression of the fiber web at a temperature ≥Tg under pressure to give a thermoformable polymer/fiber composite. This increases the density of the polymer/fiber composite compared to the corresponding fiber web, depending on the fibrous substrate used, by a factor of ≥3 and advantageously by a factor of ≥6. In a corresponding manner, there is also a decrease in the thickness of the polymer/fiber composite compared to the corresponding fiber web. What is of significance in this connection is that the polymer/fiber composite of the invention advantageously has a two-dimensional flat shape. It will be appreciated that the polymer/fiber composite of the invention may alternatively—depending on the press mold chosen—have any desired non-flat three-dimensional forms.

It is essential to the process that the aqueous dispersion of the polymer P has been prepared by free-radically initiated emulsion polymerization of a mixture of ethylenically unsaturated monomers P [monomers P] in an aqueous medium in the presence of a polymer A, where the polymer A is formed from 80% to 100% by weight of at least one ethylenically unsaturated mono- and/or dicarboxylic acid [monomers A1] and 0% to 20% by weight of at least one further ethylenically unsaturated monomer which differs from the monomers A1 [monomers A2], in copolymerized form.

Useful monomers A1 especially include α,β-monoethylenically unsaturated mono- and dicarboxylic acids having from 3 to 6 carbon atoms, possible anhydrides of these, and also water-soluble salts of these, in particular alkali metal salts of these, examples being acrylic acid, methacrylic acid, maleic acid, fumaric acid, itaconic acid, citraconic acid, tetrahydrophthalic acid, and anhydrides of these, for example maleic anhydride, and also the sodium or potassium salts of the abovementioned acids. Particular preference is given to acrylic acid, methacrylic acid, maleic acid and/or maleic anhydride, and acrylic acid is especially preferred.

Useful monomers as the at least one monomer A2 for preparation of the polymer A used in accordance with the invention are especially ethylenically unsaturated compounds that are free-radically copolymerizable with monomer A1 in a simple manner, for example ethylene, vinylaromatic monomers such as styrene, α-methylstyrene, o-chlorostyrene or vinyltoluenes, vinyl halides such as vinyl chloride or vinylidene chloride, esters derived from vinyl alcohol and from monocarboxylic acids having 1 to 18 carbon atoms, for example vinyl acetate, vinyl propionate, vinyl n-butyrate, vinyl laurate, and vinyl stearate, esters derived from α,β-monoethylenically unsaturated mono- and dicarboxylic acids having preferably from 3 to 6 carbon atoms, particular examples being acrylic acid, methacrylic acid, maleic acid, fumaric acid, and itaconic acid, with alkanols generally having 1 to 12, preferably 1 to 8 and especially 1 to 4 carbon atoms, particular examples being the methyl, ethyl, n-butyl, isobutyl, pentyl, hexyl, heptyl, octyl, nonyl, decyl, and 2-ethylhexyl esters of acrylic and of methacrylic acid, the dimethyl or di-n-butyl esters of fumaric and of maleic acid, nitriles of α,β-monoethylenically unsaturated carboxylic acids, for example acrylonitrile, methacrylonitrile, fumaronitrile, maleonitrile, and also $C_{4-8}$-conjugated dienes, such as 1,3-butadiene (butadiene) and isoprene. The monomers mentioned are generally the main monomers, and these combine to form a proportion of ≥50% by weight, preferably ≥80% by weight and especially preferably ≥90% by weight, based on the entirety of monomers A2, or indeed form the entirety of monomers A2. The solubility of these monomers in water under standard conditions [20° C. 1 atm (absolute)] is very generally only moderate to low.

Monomers A2 which have higher water solubility under the abovementioned conditions are those which comprise either at least one sulfo group and/or anion corresponding thereto or at least one amino, amido, ureido, or N-heterocyclic group, and/or nitrogen-protonated or -alkylated ammonium derivatives thereof. Examples include acrylamide and methacrylamide, and also vinylsulfonic acid, 2-acrylamido-2-methylpropanesulfonic acid, styrenesulfonic acid, and water-soluble salts thereof, and also N-vinylpyrrolidone, 2-vinyl pyridine, 4-vinylpyridine, 2-vinylimidazole, 2-(N,N-dimethylamino)ethyl acrylate, 2-(N,N-dimethylamino) ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide, and 2-(1-imidazolin-2-onyl)ethyl methacrylate. The abovementioned water-soluble monomers A2 are usually present merely as modifying monomers in amounts of ≤10% by weight, preferably ≤5% by weight and especially preferably ≤3% by weight, based on the entirety of monomers A2.

Monomers A2 which typically increase the internal strength of the films formed by a polymer matrix normally have at least one epoxy, hydroxyl, N-methylol, or carbonyl group, or at least two non-conjugated ethylenically unsaturated double bonds. Examples thereof include monomers having two vinyl radicals, monomers having two vinylidene radicals, and monomers having two alkenyl radicals. Particularly advantageous here are diesters of dihydric alcohols with α,β-monoethylenically unsaturated monocarboxylic acids, preference among these being given to acrylic and methacrylic acid. Examples of such monomers having two non-conjugated ethylenically unsaturated double bonds are alkylene glycol diacrylates and alkylene glycol dimethacrylates, such as ethylene glycol diacrylate, propylene 1,2-glycol diacrylate, propylene 1,3-glycol diacrylate, butylene 1,3-glycol diacrylate, butylene 1,4-glycol diacrylate and ethylene glycol dimethacrylate, propylene 1,2-glycol dimethacrylate, propylene 1,3-glycol dimethacrylate, butylene glycol 1,3-dimethacrylate, butylene glycol 1,4-dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, or triallyl isocyanurate. Other materials of particular significance in this context are the $C_1$-$C_8$-hydroxyalkyl esters of methacrylic and of acrylic acid, for example n-hydroxyethyl, n-hydroxypropyl, or n-hydroxybutyl acrylate and the corresponding methacrylate, and also compounds such as diacetoneacrylamide and acetylacetoxyethyl acrylate and the corresponding methacrylate. Frequently, the aforementioned crosslinking monomers A2 are used in amounts of ≤10% by weight, but preferably in amounts of ≤5% by weight, based in each case on the entirety of monomers A2. However, it is especially preferable not to use any of these crosslinking monomers A2 to produce the polymer A.

Advantageously, the polymers A are prepared by using, as monomers A2, only those monomer mixtures which comprise

| | |
|---|---|
| 90 to 100% by weight of | esters of acrylic and/or methacrylic acid with alkanols having 1 to 12 carbon atoms, or |
| 90 to 100% by weight of | styrene and/or butadiene, or |
| 90 to 100% by weight of | vinyl chloride and/or vinylidene chloride, or |
| 90 to 100% by weight of | vinyl acetate, vinyl propionate and/or ethylene. |

According to the invention, the copolymerized proportion of monomers A2 in the polymer A is 0% to 20% by weight, advantageously ≤10% by weight or ≤5% by weight and ≥0.1% by weight. In a further advantageous embodiment, the polymer A does not comprise any monomers A2 in copolymerized form at all. Accordingly, polymer A is formed to an extent of ≥80% by weight, advantageously to an extent of ≥90% by weight or ≥95% by weight, and in a further embodiment to an extent of 100% by weight of monomers A1 in copolymerized form, particularly preferred monomers A1 being acrylic acid, methacrylic acid, maleic acid and/or maleic anhydride.

The polymers A used in accordance with the invention are generally prepared by free-radically initiated polymerization of the monomers A in an aqueous medium. Advantageously, the polymers A are prepared in the presence of at least one free-radical chain transfer agent, particular preference being given to sulfur-, nitrogen- and/or phosphorus-containing free-radical chain transfer agents having a solubility of ≥5 g/100 g of water in deionized water at 20° C. and 1 atm.

The principles underlying the preparation of the polymers A are familiar to the person skilled in the art (see by way of example A. Echte, Handbuch der Technischen Polymerchemie [Handbook of Industrial Polymer Chemistry], chapter 6, VCH, Weinheim, 1993 or B. Vollmert, Grundriss der Makromolekularen Chemie [Principles of Macromolecular Chemistry], vol. 1, E. Vollmert Verlag, Karlsruhe, 1988).

Sulfur-containing free-radical chain transfer agents used are, for example, mercaptoalkanols such as 2-mercaptoethanol, 2-mercaptopropanol or 3-mercaptopropanol, alkali metal hydrogensulfites such as sodium hydrogensulfite or potassium hydrogensulfite, and thiosulfuric acid and the alkali metal salts thereof or 3-mercapto-2-aminopropanoic acid (cysteine), nitrogen-containing free-radical chain transfer agents used are, for example, hydroxylamine(ammonium) compounds such as hydroxylammonium sulfate, and phosphorus-containing free-radical chain transfer agents used are, for example, phosphorous acid, hypophosphorous acid, metaphosphorous acid, orthophosphoric acid, pyrophosphoric acid or polyphosphoric acid and the alkali metal salts thereof, especially the sodium or potassium salts thereof, advantageously sodium hypophosphite or sodium dihydrogenphosphate.

Especially advantageously, the free-radical chain transfer agent is selected from hypophosphorous acid and the alkali metal salts thereof, especially sodium hypophosphite, alkali metal hydrogensulfites, especially sodium hydrogensulfite, hydroxylammonium sulfate and/or 2-mercaptoethanol.

In the preparation of the polymers A, it is advantageous when the amount of the free-radical chain transfer agent is chosen such that the number-average molecular weight of the polymers A is ≥1000 and ≤30 000 g/mol, advantageously ≥1000 and ≤20 000 g/mol and especially advantageously ≥3000 and ≤20 000 g/mol. The required amount of the free-radical chain transfer agent and the corresponding polymerization conditions are known to the person skilled in the art or can be ascertained by such a person in simple routine tests.

In the context of this document, the molecular weight is generally determined for the polymers A using two series-connected Tosoh TSKgel G 3000 PWXL columns at a temperature of 35° C., with an eluent consisting of deionized water with 0.01 mol/l phosphate buffer, pH 7.4, and 0.01 mol/l NaN$_3$, a flow rate of 0.5 ml per minute, an injection volume of 100 µl, a concentration of the injected solution of 1 to 2 mg/ml, and a DRI detector from Agilent Technologies GmbH. The internal standard/calibration substance used was polyacrylic acid sodium salt with different defined molecular weights.

In the preparation of the polymer P used in accordance with the invention, it is optionally possible to initially charge a portion or the entirety of polymers A in the aqueous polymerization medium. Alternatively, it is possible to meter in the entirety or any remaining residual amount of polymers A together with the monomers P during the polymerization reaction. The manner in which the entirety or any remaining residual amount of polymers A is metered into the aqueous polymerization medium here can be discontinuous in one or more portions, or continuous with constant or varying flow rates. Advantageously, the entirety of polymers A is initially charged in the aqueous polymerization medium prior to triggering the polymerization reaction of the monomers P. In a further advantageous embodiment, the polymer A is prepared in situ in the polymerization medium for the polymerization of the monomers P.

What is significant is that the aqueous polymerization medium, in the preparation of the polymer P, as well as the polymer A, may additionally also comprise dispersing aids which keep both the monomer droplets and the dispersion particles of the polymer P obtained by the free-radically initiated polymerization of the monomers P dispersed in the aqueous phase and hence ensure the stability of the aqueous polymer composition produced. These may be protective colloids typically used in the performance of free-radical aqueous emulsion polymerizations or they may be emulsifiers.

Suitable protective colloids are, for example, polyvinyl alcohols, cellulose derivatives or copolymers comprising vinyl pyrrolidone. A detailed description of further suitable protective colloids is given in Houben-Weyl, Methoden der organischen Chemie [Methods of Organic Chemistry], vol. XIV/1, Makromolekulare Stoffe [Macromolecular substances], pages 411-420, Georg-Thieme-Verlag, Stuttgart, 1961. Since the polymer A used in accordance with the invention can also act as a protective colloid, it is advantageous in accordance with the invention not to use any additional protective colloids.

It is of course also possible to use mixtures of emulsifiers and/or protective colloids. Dispersing aids frequently used are exclusively emulsifiers having relative molecular weights that are typically below 1000 g/mol, by contrast with the protective colloids. They may be anionic, cationic, or nonionic. When mixtures of surface-active substances are used, the individual components must of course be compatible with one another; in case of doubt, this may be checked on the basis of a few preliminary experiments. Anionic emulsifiers are generally compatible with one another and with nonionic emulsifiers. The same also applies to cationic emulsifiers, whereas anionic and cationic emulsifiers are mostly not compatible with one another.

Commonly used emulsifiers are, for example, ethoxylated mono-, di- and trialkylphenols (EO level: 3 to 50, alkyl radical: $C_4$ to $C_{12}$), ethoxylated fatty alcohols (EO level: 3 to 50; alkyl radical: $C_8$ to $C_{36}$) and alkali metal and ammonium salts of alkyl sulfates (alkyl radical: $C_8$ to $C_{12}$), of sulfuric monoesters of ethoxylated alkanols (EO level: 3 to 30, alkyl radical: $C_{12}$ to $C_{18}$) and ethoxylated alkylphenols (EO level: 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$). Further suitable emulsifiers can be found in Houben-Weyl, Methoden der organischen Chemie [Methods of Organic Chemistry], vol. XIV/1, Makromolekulare Stoffe [Macromolecular substances], pages 192-208, Georg-Thieme-Verlag, Stuttgart, 1961.

Further suitable surface-active substances have been found to be compounds of the general formula I

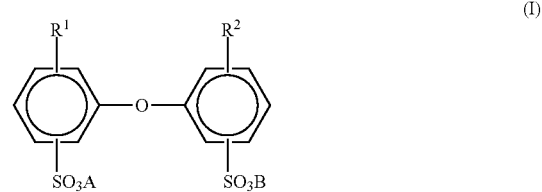

in which $R^1$ and $R^2$ are $C_4$- to $C_{24}$-alkyl and one of the $R^1$ and $R^2$ radicals may also be hydrogen, and A and B may be alkali metal ions and/or ammonium ions. In the general formula I, $R^1$ and $R^2$ are preferably linear or branched alkyl radicals having 6 to 18 carbon atoms, especially having 6, 12 or 16 carbon atoms, or hydrogen atoms, where $R^1$ and $R^2$ are not both simultaneously hydrogen atoms. A and B are preferably sodium, potassium or ammonium ions, with sodium ions being particularly preferred. Particularly advantageous compounds I are those in which A and B are sodium ions, $R^1$ is a branched alkyl radical having 12 carbon atoms and $R^2$ is a hydrogen atom or $R^1$. Technical grade mixtures comprising a proportion of 50% to 90% by weight of the monoalkylated product, for example Dowfax® 2A1 (brand of Dow Chemical Company), are frequently used. The compounds I are common knowledge, for example from U.S. Pat. No. 4,269,749, and are commercially available.

If dispersing aids are included in the preparation of the aqueous dispersion of the polymer P, the total amount of dispersing aids used, especially emulsifiers, is 0.1% to 5% by weight, preferably 1% to 3% by weight, based in each case on the total amount of the monomers P (total amount of monomers P). In an advantageous embodiment, emulsifiers are used as the sole dispersing aids.

If dispersing aids are included in the preparation of the aqueous dispersion of the polymer P, it is optionally possible to initially charge a portion or the entirety of the dispersing aids as a constituent of the aqueous medium comprising the polymer A. Alternatively, it is possible to meter in the entirety or any remaining residual amount of dispersing aids together with the monomers P during the polymerization reaction. The manner in which the entirety or any remaining residual amount of dispersing aids is metered into the aqueous polymerization medium here can be discontinuous in one or more portions, or continuous with constant or varying flow rates.

It is essential to the invention that, in the free-radically initiated aqueous emulsion polymerization of the monomers P, these are chosen in terms of type and amount such that the polymer P obtained has a glass transition temperature Tg ≥20° C., advantageously ≥60° C. and especially advantageously ≥90° C., measured according to DIN EN ISO 11357-2 (2013-09).

The performance of free-radical-initiated emulsion polymerizations of ethylenically unsaturated compounds (monomers) in an aqueous medium has already been widely described and is therefore well known to those skilled in the art [see e.g. "Emulsionspolymerisation" [Emulsion polymerization] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, "Chemie in unserer Zeit" [Chemistry in our time] 24, pages 135-142 (1990); Emulsion Polymerisation, Interscience Publishers, New York (1965); DE-A 40 03 422 and "Dispersionen synthetischer Hochpolymerer" [Dispersions of Synthetic High Polymers], F. Holscher, Springer-Verlag, Berlin (1969)]. The free-radical-initiated aqueous emulsion polymerization is typically carried out by dispersing the monomers in an aqueous medium, generally by means of dispersing aids such as emulsifiers and/or protective colloids, and polymerizing them using at least one water-soluble free-radical polymerization initiator. Commonly, the residual contents of unreacted monomers in the resulting aqueous polymer dispersions are reduced using chemical and/or physical methods likewise known to those skilled in the art [see for example EP-A 771328, DE-A 19624299, DE-A 19621027, DE-A 19741184, DE-A 19741187, DE-A 19805122, DE-A 19828183, DE-A 19839199, DE-A 19840586, and 19847115], the polymer solids content is adjusted to a desired value by diluting or concentrating, or further customary added substances, for example foam- or viscosity-modifying additives, are added to the aqueous polymer dispersion. The preparation of an aqueous dispersion of the polymer P used in accordance with the invention differs from this general procedure merely in that the monomers P are polymerized in the presence of at least one polymer A and are chosen in terms of type and amount such that the polymers P formed have a glass transition temperature Tg ≥20° C. measured according to DIN EN ISO 11357-2 (2013-09). It will be appreciated here that, for preparation of the polymers P, the scope of the present document is also to include the seed, staged and gradient modes of polymerization that are familiar to the person skilled in the art. If staged polymers are used, at least the polymer from one stage has a glass transition temperature Tg ≥20° C. Advantageously at least 50% by weight and particularly advantageously at least 90% by weight of the staged polymer comprises a polymer P having a glass transition temperature Tg ≥20° C., advantageously ≥60° C. and especially advantageously ≥90° C. Advantageously in accordance with the invention, however, one-stage polymers having a glass transition temperature Tg ≥20° C., advantageously ≥60° C. and especially advantageously ≥90° C. are used as polymers P.

Useful monomers P are especially monomers that are free-radically polymerizable in a simple manner, for example ethylene, vinylaromatic monomers such as styrene, α-methylstyrene, o-chlorostyrene or vinyltoluenes, vinyl halides such as vinyl chloride or vinylidene chloride, esters derived from vinyl alcohol and from monocarboxylic acids having 1 to 18 carbon atoms, for example vinyl acetate, vinyl propionate, vinyl n-butyrate, vinyl laurate, and vinyl stearate, esters derived from α,β-monoethylenically unsaturated mono- and dicarboxylic acids having preferably from 3 to 6 carbon atoms, particular examples being acrylic acid, methacrylic acid, maleic acid, fumaric acid, and itaconic acid, with alkanols generally having 1 to 12, preferably 1 to 8 and especially 1 to 4 carbon atoms, particular examples being the methyl, ethyl, n-butyl, isobutyl, pentyl, hexyl, heptyl, octyl, nonyl, decyl, and 2-ethylhexyl esters of acrylic and of methacrylic acid, the dimethyl or di-n-butyl esters of fumaric and of maleic acid, nitriles of α,β-monoethylenically unsaturated carboxylic acids, for example acrylonitrile, methacrylonitrile, fumaronitrile, maleonitrile, and also $C_{4-8}$ conjugated dienes, such as 1,3-butadiene and isoprene. The monomers mentioned are generally the main monomers, and these combine to form a proportion of ≥80% by weight and preferably ≥90% by weight, based on the amount of all monomers P used to prepare the polymer P (total amount of monomers P). The solubility of these monomers in water under standard conditions [20° C., 1 atm (=1.013 bar absolute)] is very generally only moderate to low.

Monomers P that have enhanced water solubility under the abovementioned conditions are those that contain either at least one acid group and/or anion corresponding thereto or at least one amino, amido, ureido, or N-heterocyclic group and/or nitrogen-protonated or nitrogen-alkylated ammonium derivative thereof. Examples include α,β-monoethylenically unsaturated mono- and dicarboxylic acids and amides thereof, e.g. acrylic acid, methacrylic acid, maleic acid, fumaric acid, itaconic acid, acrylamide, and methacrylamide, and also vinylsulfonic acid, 2-acrylamido-2-methylpropanesulfonic acid, styrenesulfonic acid, and water-soluble salts thereof, and also N-vinylpyrrolidone, 2-vinyl pyridine, 4-vinylpyridine, 2-vinylimidazole, 2-aminoethyl acrylate, 2-aminoethyl methacrylate, 2-aminopropyl acrylate, 2-aminopropyl methacrylate, 3-aminopropyl acrylate, 3-aminopropyl methacrylate, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide and 2-(1-imidazolin-2-onyl)ethyl methacrylate. The abovementioned monomers P are normally present solely as modifying monomers in amounts of ≤10% by weight and preferably ≤5% by weight, based on the total amount of monomers P.

Monomers P that typically increase the internal strength of the films formed by a polymer matrix normally have at least one epoxy, hydroxyl, N-methylol or carbonyl group, or at least two non-conjugated ethylenically unsaturated double bonds. Examples thereof include monomers having two vinyl radicals, monomers having two vinylidene radicals, and monomers having two alkenyl radicals. Particularly advantageous here are diesters of dihydric alcohols with α,β-monoethylenically unsaturated monocarboxylic acids, preference among these being given to acrylic and methacrylic acid. Examples of monomers of this type having two non-conjugated ethylenically unsaturated double bonds are alkylene glycol diacrylates and alkylene glycol dimethacrylates, for example ethylene glycol diacrylate, propylene 1,2-glycol diacrylate, propylene 1,3-glycol diacrylate, butylene 1,3-glycol diacrylate, butylene 1,4-glycol diacrylate and ethylene glycol dimethacrylate, propylene 1,2-glycol dimethacrylate, propylene 1,3-glycol dimethacrylate, butylene glycol 1,3-dimethacrylate, butylene glycol 1,4-dimethacrylate, and also 1,2-, 1,3- or 1,4-divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Other materials of particular significance in this context are the C1-C8-hydroxyalkyl esters of methacrylic and of acrylic acid, for example 2-hydroxyethyl, 2-hydroxypropyl or 3-hydroxy- or 4-hydroxybutyl acrylate and the corresponding methacrylate, and also compounds such as diacetoneacrylamide and acetylacetoxyethyl acrylate and the corresponding methacrylate. Frequently, the aforementioned monomers are used in amounts of ≤10% by weight, but preferably in amounts ≤5% by weight, based in each case on the total amount of monomers P.

In a preferred embodiment, the monomers P in the preparation of the polymers P are selected to an extent of ≥90% by weight from the group comprising olefins, vinylaromatic monomers, vinyl halides, esters of vinyl alcohol and monocarboxylic acids having 1 to 18 carbon atoms, esters of α,β-monoethylenically unsaturated mono- and dicarboxylic acids having 3 to 6 carbon atoms with alkanols having 1 to 12 carbon atoms, nitriles of α,β-monoethylenically unsaturated carboxylic acids and $C_{4-8}$-conjugated dienes, and are selected to an extent of ≤10% by weight from the group comprising α,β-monoethylenically unsaturated mono- and dicarboxylic acids having 3 to 6 carbon atoms and amides thereof, and also monoethylenically unsaturated compounds having at least one amino, epoxy, hydroxyl, N-methylol or carbonyl group and compounds having at least two nonconjugated ethylenically unsaturated double bonds.

In a further preferred embodiment, the polymer P is prepared using

| | |
|---|---|
| ≥90% and ≤99.9% by weight of | styrene and/or methyl methacrylate, |
| ≥0% and ≤9.9% by weight of | n-butyl acrylate and/or 2-ethylhexyl acrylate, and |
| ≥0.1% and ≤10.0% by weight of | acrylic acid, methacrylic acid, glycidyl acrylate, glycidyl methacrylate, 2-hydroxyethyl, 2-hydroxypropyl and 3-hydroxypropyl acrylate and methacrylate, 2-aminoethyl, 2-aminopropyl and 3-aminopropyl acrylate and -methacrylate, butylene 1,4-glycol diacrylate and methacrylate, 1,2-, 1,3- and 1,4-divinylbenzene, allyl acrylate and/or allyl methacrylate, | where the amounts add up to 100% by weight.

In a further preferred embodiment, the polymer P is prepared using

| | |
|---|---|
| ≥90% and ≤99.9% by weight of | styrene and/or methyl methacrylate, |
| ≥0% and ≤9.9% by weight of | n-butyl acrylate and/or 2-ethylhexyl acrylate, and |
| ≥0.1% and ≤2.0% by weight of | butylene 1,4-glycol diacrylate and -methacrylate, 1,2-, 1,3- and 1,4-divinylbenzene, allyl acrylate and/or allyl methacrylate, | where the amounts add up to 100% by weight.

In a particularly preferred embodiment, the polymer P is prepared using PGP-25 TI

| | |
|---|---|
| ≥90% and ≤99.7% by weight of | styrene and/or methyl methacrylate, |
| ≥0% and ≤9.9% by weight of | n-butyl acrylate and/or 2-ethylhexyl acrylate, and |
| ≥0.1% and ≤5.0% by weight of | acrylic acid, methacrylic acid, 2-hydroxyethyl, 2-hydroxypropyl and 3-hydroxypropyl acrylate and/or methacrylate, 2-aminoethyl, 2-aminopropyl and 3-aminopropyl acrylate and/or methacrylate, |
| ≥0.1% and ≤2.0% by weight of | butylene 1,4-glycol diacrylate and -methacrylate, 1,2-, 1,3- and 1,4-divinylbenzene, allyl acrylate and/or allyl methacrylate, and |
| ≥0.1% and ≤4.0% by weight of | glycidyl acrylate and/or glycidyl methacrylate, |
| and especially | |
| ≥92% and ≤97.8% by weight of | styrene and/or methyl methacrylate, |
| ≥0.1% and ≤2.0% by weight of | acrylic acid and/or 2-hydroxyethyl acrylate, |
| ≥0.1% and ≤2.0% by weight of | butylene 1,4-glycol diacrylate and/or allyl methacrylate, and |
| ≥2.0% and ≤4.0% by weight of | glycidyl acrylate and/or glycidyl methacrylate, | where the amounts add up to 100% by weight in each case.

The free-radically initiated aqueous emulsion polymerization for preparation of the polymers P is generally conducted in the presence of 0.1% to 5% by weight, preferably 0.1% to 4% by weight and especially 0.1% to 3% by weight, based in each case on the total amount of monomers P, of a free-radical polymerization initiator (free-radical initiator). Suitable free-radical initiators are all initiators that are capable of triggering a free-radical aqueous emulsion polymerization. These may in principle be peroxides or they may be azo compounds. Redox initiator systems are of course also suitable. Peroxides used may in principle be inorganic peroxides, such as hydrogen peroxide or peroxodisulfates, such as the monoalkali metal or dialkali metal or ammonium salts of peroxodisulfuric acid, for example the monosodium and disodium, monopotassium and dipotassium or ammonium salts thereof, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl peroxide or di-cumyl peroxide. Azo compounds used are primarily 2,2'-azobis(isobutyronitrile), 2,2'-azobis(2,4-dimethylvaleronitrile), and 2,2'-azobis(amidinopropyl) dihydrochloride (AIBA, corresponds to V-50 from Wako Chemicals). It is of course also possible to use so-called redox initiator systems as free-radical initiators. Suitable oxidants for redox initiator systems are primarily the peroxides mentioned above. Corresponding reductants that may be used are sulfur compounds in a low oxidation state such as alkali metal sulfites, for example potassium and/or sodium sulfite, alkali metal hydrogen sulfites, for example potassium and/or sodium hydrogen sulfite, alkali metal metabisulfites, for example potassium and/or sodium metabisulfite, formaldehyde sulfoxylates, for example potassium and/or sodium formaldehyde sulfoxylate, alkali metal salts, specifically potassium and/or sodium salts of aliphatic sulfinic acids and alkali metal hydrogen sulfides, for example potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid, and reducing saccharides, such as sorbose, glucose, fructose and/or dihydroxyacetone.

As well as the seed-free mode of preparation, the polymer particle size can also be adjusted by effecting the emulsion polymerization for preparation of the polymers P by the seed latex process or in the presence of a seed latex produced in situ. Such processes are known to those skilled in the art and can be found in the prior art (see e.g. EP-B 40 419, EP-A 567 812, EP-A 614 922 and "Encyclopedia of Polymer Science and Technology", vol. 5, page 847, John Wiley & Sons Inc., New York, 1966). For instance, the prior art recommends, in the semicontinuous feed process, initially charging a defined finely divided seed polymer dispersion in the aqueous polymerization medium and then polymerizing the monomers P in the presence of the seed latex. In this case, the seed polymer particles act as 'polymerization seeds' and decouple the polymer particle formation and polymer particle growth. During the emulsion polymerization, it is possible in principle to add further seed latex directly to the aqueous polymerization medium. This achieves broad size distributions of the polymer particles, which are often desirable especially in the case of polymer dispersions having a high solids content (in this regard, cf., for example, DE-A 4213965). Rather than the addition of a defined seed latex, it can also be produced in situ. For this purpose, for example, a portion of the monomers P used for polymerization and of the free-radical initiator is initially charged together with a portion or the entirety of the polymer A and, optionally, additional dispersing aids and heated to reaction temperature, forming a relatively finely divided polymer seed. Subsequently, in the same aqueous polymerization medium, the actual polymerization is conducted by the feed method (see also DE-A 4213965).

Advantageously, the polymers P are prepared by free-radically initiated aqueous emulsion polymerization at a reaction temperature in the range from 0 to 170° C., but particular preference is given to temperatures of 70 to 120° C. and especially 80 to 100° C. The free-radical aqueous emulsion polymerization may be carried out at a pressure of less than, equal to or greater than 1 atm (absolute). Volatile monomers such as ethylene, butadiene or vinyl chloride are preferably polymerized at elevated pressure. The pressure in the polymerization may be 1.2, 1.5, 2, 5, 10, 15 bar (overpressure) or even higher. If emulsion polymerizations are carried out at reduced pressure, pressures of 950 mbar, commonly of 900 mbar, and often 850 mbar (absolute) are set. Advantageously, the free-radical aqueous emulsion polymerization of the monomers is conducted at 1 atm (=atmospheric pressure=1.013 bar absolute) or under elevated pressure under inert gas atmosphere, for example under nitrogen or argon.

In the free-radically initiated aqueous emulsion polymerization, the aqueous polymerization medium may in principle also comprise minor amounts (≤5% by weight) of water-soluble organic solvents, for example methanol, ethanol, isopropanol, butanols, pentanols, but also acetone, etc. Preferably, however, the free-radically initiated aqueous emulsion polymerization is effected in the absence of such solvents.

The polymers P used in accordance with the invention have a glass transition temperature Tg ≥20° C. measured according to DIN EN ISO 11357-2 (2013-09). Advantageously, the glass transition temperature of the polymers P is within the range of ≥60° C., especially within the range of ≥60 and ≤150° C. and particularly advantageously within the range of ≥90° C., especially within the range of ≥90 and ≤120° C.

A further important point is that, according to Fox (T. G. Fox, Bull. Am. Phys. Soc. 1956 [Ser. II] 1, page 123 and according to Ullmann's Encyclopädie der technischen Chemie [Ullmann's Encyclopedia of Industrial Chemistry], vol. 19, page 18, 4th edition, Verlag Chemie, Weinheim, 1980), the glass transition temperature of at most lightly crosslinked copolymers can be estimated in a good approximation by the following equation:

$$1/Tg = x_1/Tg^1 + x_2/Tg^2 + \ldots x_n/Tg^n,$$

where $x_1, x_2, \ldots x_n$ are the mass fractions of the monomers $1, 2, \ldots n$ and $Tg^1, Tg^2, \ldots Tg^n$ are the glass transition temperatures in degrees kelvin of the homopolymers synthesized from in each case only one of the monomers $1, 2, \ldots n$. The glass transition temperatures of these homopolymers of most ethylenically unsaturated monomers are known (or can be ascertained experimentally in a simple manner known per se) and are listed, for example, in J. Brandrup, E. H. Immergut, Polymer Handbook 1st Ed. J. Wiley, New York, 1966, 2nd Ed. J. Wiley, New York, 1975 and 3rd Ed. J. Wiley, New York, 1989, and in Ullmann's Encyclopedia of Industrial Chemistry, page 169, Verlag Chemie, Weinheim, 1992.

The aqueous dispersions of the polymer P obtainable by emulsion polymerization typically have a solids content of ≥10% and ≤70% by weight, frequently ≥20% and ≤65% by weight and often ≥25% and ≤60% by weight, based in each case on the aqueous polymer dispersion.

Particularly advantageously, the polymers P are in the form of particles having an average particle diameter ≥10 and ≤1000 nm, advantageously ≥30 and ≤600 nm and particularly advantageously ≥100 to ≤500 nm, determined by the method of quasielastic light scattering (ISO Standard 13 321; cumulant z-average).

According to the invention, the weight ratio of polymers P (calculated as the total amount of monomers P) to polymers A is within the range of ≥1 and ≤10, advantageously within the range of ≥1.5 and ≤8 and especially within the range of ≥2 and ≤6.

In the production of the polymer/fiber composite, advantageously ≥0.1% and ≤20% by weight and particularly advantageously ≥0.5% and ≤15% by weight and advantageously ≥2% and ≤10% by weight of polymers P (calculated as the total amount of monomers P), based on the amount of fibrous substrate, is used.

As well as the polymer P, at least one organic di- or polyisocyanate compound I is used in the process of the invention.

The di- or polyisocyanate compounds I used here may either be of aromatic or aliphatic structure, preference being given to aromatic di- or polyisocyanate compounds I.

Aromatic di- or polyisocyanate compounds I are those which comprise at least one aromatic ring system, i.e. both purely aromatic and araliphatic compounds.

Useful aliphatic di- or polyisocyanate compounds I include both alicyclic and cycloaliphatic compounds.

Cycloaliphatic di- or polyisocyanate compounds I are those that comprise at least one cycloaliphatic ring system, whereas alicyclic di- or polyisocyanate compounds I have exclusively straight or branched hydrocarbyl radicals.

The diisocyanate compounds usable in accordance with the invention have just two isocyanate groups, whereas the polyisocyanate compounds have more than two isocyanate groups. It is significant in accordance with the invention, however, that the reaction products of the di- or polyisocyanate compounds I with themselves (oligomerization reactions of the isocyanate groups) are also to be included.

Examples of diisocyanate compounds I usable in accordance with the invention are alicyclic diisocyanates such as tetramethylene diisocyanate, pentamethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate (e.g. methyl or ethyl 2,6-diisocyanatohexanoate), trimethylhexane diisocyanate or tetramethylhexane diisocyanate, cycloaliphatic diisocyanates such as 1,4-, 1,3- or 1,2-diisocyanatocyclohexane, 4,4'- or 2,4'-di-(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane, and also 3(or 4), 8(or 9)-bis-(isocyanatomethyl)tricyclo[5.2.1.0$^{2,6}$]decane isomer mixtures, and also aromatic diisocyanates such as tolylene 2,4- or 2,6-diisocyanate and the isomer mixtures thereof, m- or p-xylylene diisocyanate, diphenylmethane diisocyanate (MDI), especially diphenylmethane 2,2'-diisocyanate (2,2'-MDI), diphenylmethane 2,4'-diisocyanate (2,4'-MDI) or diphenylmethane 4,4'-diisocyanate (4,4'-MDI) and isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3, 3'-dimethylbiphenyl, 3-methyldiphenylmethane 4,4'-diisocyanate, tetramethylxylylene diisocyanate, 1,4 diisocyanatobenzene or diphenyl ether 4,4'-diisocyanate.

Particular preference is given to diphenylmethane 2,2'-diisocyanate (2,2'-MDI), diphenylmethane 2,4'-diisocyanate (2,4'-MDI) or diphenylmethane 4,4'-diisocyanate (4,4'-MDI) and isomer mixtures (MDI) thereof.

Examples of polyisocyanate compounds I are triisocyanates such as triisocyanatononane, 2'-isocyanatoethyl 2,6-diisocyanatohexanoate, 2,4,6-triisocyanatotoluene, triphenylmethane triisocyanate or 2,4,4'-triisocyanatodiphenyl ether, or the mixtures of diisocyanates, triisocyanates, and higher polyisocyanates that are obtained, for example, by phosgenating corresponding aniline/formaldehyde condensates and constitute polyphenyl polyisocyanates having methylene bridges.

It is also significant that the polyisocyanate compounds I usable in accordance with the invention are also to include the oligomerization products of the aforementioned diisocyanate compounds I, which generally have an average NCO functionality of at least 1.8, but this may be up to 8. The average NCO functionality is preferably in the range from 2 to 5 and more preferably in the range from 2.4 to 4. The content of isocyanate groups after the oligomerization, calculated as NCO=42 g/mol, is generally in the range from 5% to 25% by weight.

However, the invention also includes the following polyisocyanate compounds I:

1) Polyisocyanates which have isocyanurate groups and derive from aromatic, alicyclic and/or cycloaliphatic diisocyanates. Particular preference here is given to the corresponding alicyclic and/or cycloaliphatic isocyanato-isocyanurates and in particular to those based on hexamethylene diisocyanate and isophorone diisocyanate. The isocyanurates present are, in particular, tris (isocyanatoalkyl) and/or trisfisocyanatocycloalkyl) isocyanurates, which constitute cyclic trimers of the diisocyanates, or are mixtures with their higher homologs having more than one isocyanurate ring. The isocyanatoisocyanurates generally have an NCO content of 10% to 30% by weight, in particular 15% to 25% by weight, and an average NCO functionality of 2.6 to 8.

The polyisocyanates having isocyanurate groups may, to a smaller degree, also comprise urethane and/or allophanate groups, preferably with a content of bound alcohol of less than 2%, based on the polyisocyanate.

2) Polyisocyanates having uretdione groups, with aromatically, alicyclically and/or cycloaliphatically bonded isocyanate groups, preferably aliphatically and/or cycloaliphatically bonded, and in particular those derived from hexamethylene diisocyanate or isophorone diisocyanate. Uretdione diisocyanates are cyclic dimerization products of diisocyanates. The polyisocyanates having uretdione groups are frequently obtained in a mixture with other polyisocyanates, especially those mentioned under 1). Polyisocyanates having uretdione groups typically have functionalities in the range from 2 to 3.

3) Biuret group-containing polyisocyanates having aromatically, cycloaliphatically or alicyclically bonded, preferably cycloaliphatically or alicyclically bonded, isocyanate groups, especially tris(6-isocyanatohexyl) biuret or mixtures thereof with higher homologs thereof. These polyisocyanates having biuret groups generally have an NCO content in the range from 18% to 24% by weight and an average NCO functionality in the range from 2.8 to 6.

4) Urethane and/or allophanate group-containing polyisocyanates having aromatically, alicyclically or cycloaliphatically bonded, preferably alicyclically or cycloaliphatically bonded, isocyanate groups, such as, for example, by reaction of excess amounts of diisocyanate, for example hexamethylene diisocyanate or isophorone diisocyanate, with mono- or polyhydric alcohols. These polyisocyanates having urethane and/or allophanate groups generally have an NCO content in the range from 12% to 24% by weight and an average NCO functionality in the range from 2.0 to 4.5. These polyisocyanates having urethane and/or allophanate groups frequently occur in mixed forms with the polyisocyanates mentioned under 1).

5) Polyisocyanates comprising oxadiazinetrione groups, derived preferably from hexamethylene diisocyanate or isophorone diisocyanate. Such polyisocyanates comprising oxadiazinetrione groups are obtainable from diisocyanate and carbon dioxide.

6) Polyisocyanates comprising iminooxadiazinedione groups, preferably derived from hexamethylene diisocyanate or isophorone diisocyanate. Such polyisocyanates comprising iminooxadiazinedione groups are preparable from diisocyanates by means of specific catalysts.

7) Uretonimine-modified polyisocyanates.

8) Carbodiimide-modified polyisocyanates.

9) Hyperbranched polyisocyanates, of the kind known for example from DE-A 10013186 or DE-A 10013187.

10) Polyurethane-polyisocyanate prepolymers, from di- and/or polyisocyanates with alcohols.
11) Polyurea-polyisocyanate prepolymers.
12) The polyisocyanates 1)-11), preferably 1), 3), 4) and 6), after preparation thereof, can be converted to biuret group-containing or urethane/allophanate group-containing polyisocyanates having aromatically, cycloaliphatically or alicyclically bonded, preferably cycloaliphatically and/or alicyclically bonded, isocyanate groups. Biuret groups are formed, for example, by addition of water or reaction with amines. Urethane and/or allophanate groups are formed by reaction with monohydric, dihydric or polyhydric, preferably monohydric, alcohols, optionally in the presence of suitable catalysts. These biuret or urethane/allophanate group-containing polyisocyanates generally have an NCO content in the range from 10% to 25% by weight and an average NCO functionality in the range from 3 to 8.
13) Hydrophilically modified polyisocyanates, i.e. polyisocyanates which, as well as the groups described under 1-12, comprise those which arise in a formal sense through addition of molecules having NCO-reactive groups and hydrophilizing groups onto the isocyanate groups of the above molecules. The latter are nonionic groups such as alkyl polyethylene oxide and/or ionic groups derived from phosphoric acid, phosphonic acid, sulfuric acid or sulfonic acid, or salts thereof.
14) Modified polyisocyanates for dual-cure applications, i.e. polyisocyanates which, as well as the groups described under 1-11, comprise those which arise in a formal sense through addition of molecules having NCO-reactive groups and groups crosslinkable by UV or actinic radiation onto the isocyanate groups of the above molecules. These molecules are, for example, hydroxyalkyl (meth)acrylates and other hydroxyl-vinyl compounds.

In a preferred embodiment, the di- or polyisocyanate compound I used is 2,2'-MDI, 2,4'-MDI, 4,4'-MDI and/or oligomeric MDI, consisting of higher polycyclic homologs of MDI having at least 3 aromatic rings and an isocyanate functionality of >2, or crude MDI obtained in the preparation of MDI. In a particularly preferred embodiment, mixtures of at least one oligomer of MDI and at least one of the aforementioned low molecular weight MDI derivatives 2,2'-MDI, 2,4'-MDI or 4,4'-MDI (such mixtures are also referred to as polymeric MDI) are used.

Polymeric MDI preferably comprises one or more multiring condensation products of MDI having a functionality of greater than 2, especially 3 or 4 or 5, in addition to tworing-MDI. Polymeric MDI is known and is frequently referred also to as polyphenylpolymethylene polyisocyanate.

The (average) functionality of a polyisocyanate comprising polymeric MDI can vary in the range from about 2.2 to about 4, in particular from 2.5 to 3.8 and in particular from 2.7 to 3.5. Such a mixture of MDI-based polyfunctional isocyanates having different functionalities is especially the crude MDI obtained as intermediate in the preparation of MDI.

Polyfunctional isocyanates or mixtures of a plurality of polyfunctional isocyanates based on MDI are known and are sold, for example, by BASF Polyurethanes GmbH under the Lupranat® M 20 or Lupranat® M 50 name.

In a particularly preferred embodiment, the di- or polyisocyanate compound I used is hydrophilically modified MDI or emulsified polymeric MDI. Hydrophilically modified MDI comprises reaction products of MDI where a small proportion of the isocyanate groups has been reacted with hydrophilic compounds having at least one isocyanate-reactive group, for example a methoxy polyethylene glycol. Corresponding products, for example the Suprasec® or Rubinate® MDI product series from Huntsman Polyurethanes, are available on the market (in this regard see, for example, M. Broekaert, New emulsifiable MDI-variants for sealers and primers on dry and wet concrete, 2004, available online at http://www.huntsman.com/polyurethanes/Media%20Library/a_MC1CD1F5AB7BB1738E040EBCD2B6B01F1/Products_MC1CD1F5AB8081738E040EBCD2B6B01F1/Adhesives_former_MC1CD1F5B06E31738E040EBCD2B6B01F1/Technical%20presentati_MC1CD1F5B098A1738E040EBCD2B6B01F1/files/marc_broekaert_berlin_2004.pdf).

By contrast, the emulsified polymeric MDI is polymeric MDI emulsified in droplet form in water. In order to suppress the depletion of the isocyanate groups by reaction with water, the droplets of the polymeric MDI are encased with a thin layer of polyurea (in this regard see, for example, A. N. Papadopoulos, C. A. S. Hill, E. Traboulay, J. R. B. Hague, Isocyanate Resins for Particleboard: PMDI vs EMDI, 2002, available online at http://www.fidelityco.net/pdf/emdi-pm-di.pdf or R. Tan, Wood 493, 2012, available online at https://pdfs.semanticscholar.org/eeda/43ac33b168e324473de1e74b74aff4e85b13.pdf). Corresponding products are available on the market, for example Lupramat® MP 100/1 from BASF Polyurethane GmbH (content of emulsified polymeric MDI: 40% by weight).

In the production of the polymer/fiber composite, advantageously ≥0.1% and ≤10% by weight and particularly advantageously ≥0.5% and ≤8% by weight and advantageously ≥2% and ≤6% by weight of di- and polyisocyanate compound I, based on the amount of fibrous substrate, is used.

By the process of the invention, in particular, thermoformable polymer/fiber composites having a basis weight of ≥500 and ≤30 000 g/m², especially advantageously ≥1000 and ≤20 000 g/m² and advantageously ≥1000 and ≤10 000 g/m² are obtainable. In this context, the thermoformable polymer/fiber composites obtainable by the process of the invention, in a preferred embodiment, are two-dimensionally flat, whereas, in a further preferred embodiment, they have a non-flat three-dimensional structure.

The invention accordingly also encompasses the thermoformable polymer/fiber composites as obtainable by the process of the invention.

In a corresponding manner, the invention also encompasses the use of a thermoformable polymer/fiber composite of the invention for production of a polymer/fiber molding which differs from the thermoformable polymer/fiber composite used in terms of its shape.

Accordingly, the invention also encompasses a process for producing a polymer/fiber molding, which comprises heating a thermoformable polymer/fiber composite of the invention up to a temperature ≥Tg, converting the polymer/fiber composite thus obtained at a temperature ≥Tg to the desired shape of the polymer/fiber molding and then cooling the polymer/fiber molding obtained down to a temperature <Tg while retaining its shape.

According to the invention, the polymer/fiber composite is heated up to a temperature corresponding at least to the glass transition temperature Tg of the polymer P. Advantageously, the polymer/fiber composite is heated up to a temperature Tg+≥10° C. and particularly advantageously Tg+≥30° C.

It is also significant that the polymer/fiber molding, in one embodiment, is produced by means of a heated mold press, the contact surface of which has a temperature ≥Tg and optionally a defined surface structure (i.e. a pattern projecting out of and/or into the contact surface), and the form of which corresponds to the negative mold of the polymer/fiber molding and the cooling of which is effected outside the mold press. In this embodiment, the heating operation and forming operation are effected in the heated mold press. It will be appreciated that it is also possible in accordance with the invention that the polymer/fiber composite is heated up to a temperature ≥Tg outside the mold press and then formed within the mold press without further heating to give the polymer/fiber molding while being cooled to a temperature ≤Tg. In this embodiment, the heating operation and the forming/cooling operation are effected separately.

In a preferred embodiment, the operation of heating the polymer/fiber composite is effected by means of passage between two metal rolls in an axially parallel arrangement that rotate in the direction of passage, wherein
  a) at least one of the metal rolls has a defined surface structure of the contact surface to the polymer/fiber composite and a temperature ≥Tg,
  b) the gap between the contact surfaces of the two metal rolls is less than the thickness of the polymer/fiber composite, and
  c) the passage of the polymer/fiber composite between the contact surfaces of the two metal rolls is at the speed corresponding to the speed of rotation of the contact surfaces of the two metal rolls.

It is self-evident to the person skilled in the art here that the defined surface structure of the contact surface of the at least one metal roll constitutes the negative of the surface structure formed on the heated polymer/fiber composite and ultimately also on the polymer/fiber molding. It is also self-evident that the difference between the thickness of the polymer/fiber composite and the gap between the contact surfaces of the two metal rolls corresponds to the maximum depth of the positive surface structure formed on the polymer/fiber composite. In the present embodiment, the gap width advantageously corresponds to the thickness of the polymer/fiber composite multiplied by a factor of ≤0.98, particularly advantageously by a factor of ≤0.6 and especially advantageously by a factor of ≤0.25. In order that the positive surface structures can form optimally on the polymer/fiber composite, it is obligatory that the passage of the polymer/fiber composite between the contact surfaces of the two metal rolls is at the speed (in m/sec) corresponding to the speed of rotation of the contact surfaces (in m/sec) of the two metal rolls.

The thickness of the polymer/fiber composite prior to the heating operation is generally in the range of ≥1 mm and ≤10 cm, frequently in the range of ≥1 mm and ≤3 cm and often in the range of ≥1 mm and ≤1 cm.

In a further advantageous embodiment, the process of the invention is effected in such a way that, before or after the heating operation but before the forming step, an intermediate process step is also conducted in which a two-dimensional decor material having a thickness of ≤10 mm is applied to one and/or the other surface of the polymer/fiber composite.

The decor material usable in accordance with the invention is advantageously a textile fabric, for example a nonwoven material, a weave or a knit made from natural or synthetic fibers, a polymer film, for example a thermoplastic polyvinyl chloride, polyolefin or polyester film, a foamed sheetlike material, for example a sheetlike material composed of a polyolefin or polyurethane foam, a foamed sheetlike material which has in turn been coated (laminated) on the surface that does not come into contact with the heated polymer/fiber composite with a textile fabric, a polymer film or a further foamed sheetlike material, or a wood veneer.

The two-dimensional decor material generally has a thickness of ≤10 mm. If the two-dimensional decor material is a textile fabric or a polymer film, the thickness thereof is generally ≤3 mm, frequently advantageously ≤2 mm and frequently especially advantageously ≤1 mm. If, however, the two-dimensional decor material is a foamed sheetlike material or a coated (laminated) foamed sheetlike material, the thickness thereof is frequently ≤8 mm, often ≤5 mm and particularly often ≤3 mm. If the two-dimensional decor material is a wood veneer, however, the thickness thereof is generally ≤3 mm, frequently advantageously ≤2 mm and frequently especially advantageously ≤1 mm.

The invention therefore also encompasses the polymer/fiber moldings obtainable by the aforementioned process.

It is also of significance in accordance with the invention that both the process for production of the thermoformable polymer/fiber composite and the process for production of the polymer/fiber molding can be effected continuously or batchwise.

The polymer/fiber moldings obtainable in accordance with the invention have good thermal dimensional stability and improved water resistance, and are therefore advantageously suitable as a component in motor vehicle construction, for example as a door insert, door decor element, knee bolster, glovebox, parcel shelf, sunvisor, center console, rear trunk trim or seat back trim, in built structures, for example as floor covering, especially click laminate, room divider, dividing wall, cover panel or wall decor part, and in furniture as a furniture molding, for example as a seat or backrest surface, particular preference being given to use as floor covering, furniture molding or wall decor part.

The present document accordingly comprises the following embodiments in particular:

1. A process for producing a thermoformable polymer/fiber composite using a fibrous substrate, an organic di- or polyisocyanate compound I and a polymer P, where
  the fibrous substrate is introduced into a gas stream, then
  the fibrous substrate in the gas stream is contacted with an aqueous dispersion of a polymer P having a glass transition temperature Tg and an organic di- or polyisocyanate compound I, then
  the fibrous substrate that has been contacted with the aqueous dispersion of the polymer P and the organic di- or polyisocyanate compound I is dried in the gas stream and then deposited, then
  the deposited fibrous substrate obtained is converted to a fiber web, and then
  the fiber web obtained is consolidated at a temperature ≥Tg to give a thermoformable polymer/fiber composite,
  which comprises effecting the aqueous dispersion of the polymer P by free-radically initiated emulsion polymerization of a mixture of ethylenically unsaturated monomers P [monomers P] in an aqueous medium in the presence of a polymer A, where the polymer A is formed from a) 80% to 100% by weight of at least one ethylenically unsaturated mono- and/or dicarboxylic acid [monomers A1] and
b) 0% to 20% by weight of at least one further ethylenically unsaturated monomer which differs from the monomers A1 [monomers A2], in copolymerized form,
and where the monomers P are chosen in terms of type and amount such that the polymer P obtained has a glass transition temperature Tg ≥20° C. measured according to DIN EN ISO 11357-2 (2013-09).
2. The process according to embodiment 1, wherein the weight ratio of polymer P to polymer A is ≥1 and ≤10.
3. The process according to either of embodiments 1 and 2, wherein the polymer A has a number-average molecular weight of ≥1000 and ≤30 000 g/mol.
4. The process according to any of embodiments 1 to 3, wherein the polymer P is prepared using

| | |
|---|---|
| ≥90% and ≤99.9% by weight of | styrene and/or methyl methacrylate, |
| ≥0% and ≤9.9% by weight of | n-butyl acrylate and/or 2-ethylhexyl acrylate, and |
| ≥0.1% and ≤10.0% by weight of | acrylic acid, methacrylic acid, glycidyl acrylate, glycidyl methacrylate, 2-hydroxyethyl, 2-hydroxypropyl and 3-hydroxypropyl acrylate and methacrylate, 2-aminoethyl, 2-aminopropyl and 3-aminopropyl acrylate and methacrylate, butylene 1,4-glycol diacrylate and -methacrylate, 1,2-, 1,3- and 1,4-divinylbenzene, allyl acrylate and/or allyl methacrylate, |
| where the amounts add up to 100% by weight. | |

5. The process according to any of embodiments 1 to 4, wherein the organic di- or polyisocyanate compound I is an aromatic di- or polyisocyanate compound.
6. The process according to any of embodiments 1 to 5, wherein the organic di- or polyisocyanate compound I is diphenylmethane 2,2'-diisocyanate (2,2'-MDI), diphenylmethane 2,4'-diisocyanate (2,4'-MDI), diphenylmethane 4,4'-diisocyanate (4,4'-MDI) and/or oligomeric diphenylmethane diisocyanate.
7. The process according to any of embodiments 1 to 6, wherein the fibrous substrate used is a natural fiber.
8. The process according to any of embodiments 1 to 7, wherein the fibrous substrate is contacted in the gas flow direction first with the aqueous dispersion of the polymer P and only then with the organic di- or polyisocyanate compound I.
9. The process according to any of embodiments 1 to 8, wherein the amount of polymer P is 0.1% to 15% by weight and the amount of organic di- or polyisocyanate compound I is 0.1% to 10% by weight, based in each case on the amount of the fibrous substrate.
10. The process according to any of embodiments 1 to 9, wherein the resultant thermoformable polymer/fiber composite is two-dimensional and has a basis weight of ≥500 and ≤30 000 g/m².
11. A thermoformable polymer/fiber composite obtainable by a process according to any of embodiments 1 to 10.
12. The use of a thermoformable polymer/fiber composite according to embodiment 11 for production of a polymer/fiber molding which differs in shape from the thermoformable polymer/fiber composite used.
13. A process for producing a polymer/fiber molding, which comprises heating a thermoformable polymer/fiber composite according to embodiment 11 up to a temperature ≥Tg, converting the polymer/fiber composite thus obtained at a temperature ≥Tg to the desired shape of the polymer/fiber molding and then cooling the polymer/fiber molding obtained down to a temperature ≤Tg while retaining its shape.
14. The process for producing a polymer/fiber molding according to embodiment 13, wherein the operation of heating the polymer/fiber composite is effected by means of passage between two metal rolls in an axially parallel arrangement that rotate in the direction of passage, wherein
a) at least one of the metal rolls has a defined surface structure of the contact surface to the polymer/fiber composite and a temperature ≥Tg,
b) the gap between the contact surfaces of the two metal rolls is less than the thickness of the polymer/fiber composite, and
c) the passage of the polymer/fiber composite between the contact surfaces of the two metal rolls is at the speed corresponding to the speed of rotation of the contact surfaces of the two metal rolls.
15. The process according to embodiment 13 or 14, wherein the heating step is preceded or followed by application of a two-dimensional decorative material to the polymer/fiber composite.
16. A polymer/fiber molding obtainable by a process according to embodiments 13 to 15.
17. The use of a polymer/fiber molding according to embodiment 15 as floor covering, furniture molding or wall decor part.

The invention is to be elucidated by nonlimiting examples that follow.

EXAMPLES

Preparation of an Aqueous Polymer P1 Dispersion (Dispersion 1)

A 500 L pilot plant reactor equipped with a stirrer, a reflux condenser and metering devices was initially charged at 20 to 25° C. (room temperature) and under a nitrogen atmosphere with 36.5 kg of deionized water, and heated up to 95° C. under atmospheric pressure (1.013 bar absolute) while stirring. On attainment of this temperature, 14.0 kg of a 7% by weight aqueous solution of sodium persulfate were metered in continuously while stirring within 10 minutes. Subsequently, the following were metered continuously into the reaction vessel at constant flow rates while stirring and while maintaining the aforementioned temperature, each commencing at the same time: a mixture of 61.6 kg of acrylic acid, 3.2 kg of methyl methacrylate and 40.5 kg of deionized water within 70 minutes, and a mixture of 14.0 kg of a 40% by weight aqueous solution of sodium hydrogensulfite and 1.4 kg of deionized water, likewise within 70 minutes, and 32.5 kg of a 7% by weight aqueous solution of sodium persulfate within 75 minutes. Subsequently, the polymerization mixture was stirred for a further 5 minutes and then cooled down to 93° C. Thereafter, 13.9 kg of 25% by weight sodium hydroxide solution were metered in while stirring within 10 minutes and hence a pH of 3.3 was established, followed by stirring for a further 5 minutes. Subsequently, feed 1 was metered in within 170 minutes, with addition first of 48% by weight of feed 1 within 20 minutes and then of 52% by weight of feed 1 within 150 minutes—each continuously at constant flow rates. Feed 1 consisted of 21.8 kg of a 7% by weight aqueous solution of sodium persulfate. 5 minutes after the start of feed 1, feed 2 was metered in continuously at constant flow rate while maintaining the aforementioned polymerization temperature within 150 minutes. Feed 2 consisted of a homogeneous emulsion produced from 28.4 kg of deionized water, 3.86 kg of a 28% by weight aqueous solution of sodium lauryl ether sulfate (Disponil® FES 27; product from BASF SE), 2.88 kg of a 15% by weight aqueous solution of sodium dodecylsulfate (Disponil® SDS 15; product from BASF SE), 4.54 kg of glycidyl methacrylate, 1.06 kg of butane-1,4-diol diacrylate, 57.00 g of methyl methacrylate, 86.48 kg of styrene and 2.12 kg of acrylic acid. After the addition of feed 1 had ended, stirring was continued for another 10 minutes. Subsequently, 108 g of a defoamer (TEGO® Foamex 822; product from Evonik Resource Efficiency GmbH) were added. Thereafter, the polymerization mixture was cooled down to 90° C., and feeds 3 and 4, commencing simultaneously, were added continuously at constant flow rates within 30 minutes. Feed 3 consisted of 650 g of a 10% by weight aqueous solution of tert-butyl hydroperoxide, and feed 4 consisted of 820 g of a 13.1% by weight aqueous solution of acetone bisulfite (molar 1:1 addition product of acetone and sodium hydrogensulfite). Thereafter, the polymerization mixture obtained was cooled down to room temperature and filtered through a 125 µm filter. The aqueous polymer dispersion obtained had a solids content of 53.5% by weight. The number-average particle size was determined as 347 nm and the glass transition temperature as 103° C.

The solids content was generally determined with a Mettler Toledo moisture analyzer by drying of 0.5 to 1 g of a polymer dispersion or polymer solution obtained to constant weight at 140° C.

The glass transition temperature was generally determined with the aid of a TA Instruments Q 2000 differential calorimeter. The heating rate was 10 K per minute.

The number-average particle size of the dispersion particles was generally determined by dynamic light scattering on a 0.005 to 0.01% by weight aqueous dispersion at 23° C. using an Autosizer IIC from Malvern Instruments, England. What is reported is the cumulant z-average diameter of the measured autocorrelation function (ISO Standard 13321).

The pH values were generally determined by analyzing a sample with a Schott pH electrode at room temperature.

Performance Testing

The studies were conducted with a 12 inch refiner from Antriz and a blowline connected thereto. The refiner was operated at 160 to 170° C. and an internal pressure of 5 to 6 bar (gauge). The distance between the two grinding plates was 0.3 mm, and one of the grinding plates was operated at 3000 revolutions per minute. The blowline (steel tube) connected to the refiner via a flange had an internal diameter of 3 cm and a tube length of 30 m. The aqueous polymer dispersion P was then injected at 2 bar (gauge) via a 0.2 mm nozzle that was within the blowline at a distance of 50 cm from the refiner outlet/blowline inlet, and the di- or polyisocyanate I was likewise injected at 2 bar gauge via a 0.2 mm nozzle that was within the blowline at a distance of 80 cm from the refiner outlet/blowline inlet. At the end of the blowline was a cyclone separator, by means of which the coated wood fibers were dried further, and cooled down to a temperature of about 80° C. and deposited into an open vessel.

For the studies, spruce woodchips that have been pretreated with water/steam at 160 to 170° C. at 5 to 6 bar (gauge) in a so-called boiler were used, with the mass flow rate of woodchips into the refiner (or wood fibers into the blowline) set at 30 kg per hour.

The binder used was dispersion 1, and isocyanates used were Lupramat® M 20 R (PMDI), product from BASF Polyurethane GmbH, Lupramat® M1 (MDI), product from BASF Polyurethane GmbH, and Lupramat® MP 100/1, a 40% by weight aqueous PMDI dispersion (E-PMDI), product from BASF Polyurethane GmbH, alone and in combination with the di- and polyisocyanates mentioned. The binders were injected here into the blowline via the 0.2 mm nozzle(s) by means of an eccentric screw pump at a pressure of 2 bar (gauge), with the mass flow rates adjusted in each case to the respective amount of binder required (calculated as solids) per hour. There was a test for each binder or binder combination over 2 hours in the continuous steady state, with collection of the wood fibers sprayed with the respective binder in an open vessel over the course of this time as well. In this way, the fiber/binder combinations described in table 1 were produced, the stated amounts being parts by weight. It should be noted here that the quantitative data of dispersion 1 and E-PMDI are based on the respective solids contents.

TABLE 1

Fiber/binder combinations produced (in parts by weight)

| Type | Wood fibers | Dispersion 1 | PMDI | MDI | E-PMDI |
|---|---|---|---|---|---|
| VD1 | 100 | 10 | — | — | — |
| VP1 | 100 | — | 5 | — | — |
| VM1 | 100 | — | — | 5 | — |
| VE1 | 100 | — | — | — | 5 |
| EP1 | 100 | 5 | 5 | — | — |
| EM1 | 100 | 5 | — | 5 | — |
| EE1 | 100 | 5 | — | — | 5 |

Study of the Mechanical Properties

The coated fibers obtained from the blowline according to the aforementioned experimental procedure were used to produce 51×51 cm fiberboards with a thickness of 4.5 mm and a density of 0.8 g/cm$^3$. For this purpose, 936 g of the fibers obtained were scattered homogeneously into a horizontal wood frame having internal dimensions of 51×51×30 cm (L/B/H). Thereafter, a 51×51 cm wooden board was placed horizontally onto the fiber web present within the wooden frame and the fiber web was subjected to preliminary compaction to a height of 10 cm with a ram in the middle. The fiber cake thus obtained was then taken out of the wooden frame, covered with a release paper on both square faces and compacted to a thickness of 4.5 mm between two 10 mm-thick horizontal separation plates at 200° C. under pressure at a compression rate of 10 seconds per mm, with the lower face of the fiber cake being placed onto the lower horizontal separation plate in each case. Thereafter, the fiberboards obtained were left to cool down to room temperature outside the press.

The fiberboards thus obtained, depending on the binder used, are called FVD1 (fiberboard with dispersion 1), FVP1 (fiberboard with PMDI), FVM1 (fiberboard with MDI), FVE1 (fiberboard with E-PMDI), FEP1 (fiberboard with dispersion 1 and PMDI), FEM1 (fiberboard with dispersion 1 and MDI) and FEE1 (fiberboard with dispersion 1 and E-PMDI).

The aforementioned fiberboards were subjected to a second compaction to a density of 0.9 g/m$^3$, with storage of the fiberboards first in a climate-controlled room at 23° C. and 50% relative humidity for one week. Thereafter, the fiberboards were compressed to a thickness of 4.0 mm, corresponding to a density of 0.9 g/cm$^3$, in a heated press at 160° C., using an embossed plate in the contact press to impress a sharp-edged engraving with a depth of 0.1 to 1.0 mm in each case within 60 seconds.

Water absorption and thickness swelling were determined on the fiberboards obtained after this further compression, and the embossment was assessed visually.

The water absorption and thickness swelling were determined here in such a way that corresponding 5×5 cm test specimens were punched out of the fiberboards and these were then weighed accurately and their thicknesses were determined exactly. Subsequently, these test specimens were stored vertically in deionized water at 23° C. for 24 hours, then dabbed dry with a cotton cloth and then weighed, and the thickness of the individual test specimens was determined. The water absorption (in % by weight) was determined here from the difference in weight of the test specimens after and before the water storage multiplied by 100, divided by the respective weight before the water storage. In a corresponding manner, the thickness swelling was also determined from the difference in the thickness of the test specimens after and before the water storage multiplied by 100, divided by the thickness of the test specimens before the water storage. 5 test specimens were produced from each fiberboard and used for the tests. The test values reported below are the averages of these 5 measurements. The lower the water absorption and the lower the thickness swelling, the better the assessment of the water resistance. The results obtained for the respective test specimens are listed in table 2.

Embossability was assessed in that the edges of the embossment of the respective test specimens were assessed visually, after water storage, by means of a magnifying glass (with 12-fold magnification). Embossability was assessed as good (+) when the edges of the embossments after water storage did not have any visible protruding or loose fibers [=roughness]. By contrast, if the edges of the embossments after water storage had visible protruding or loose fibers, embossability was assessed as inadequate (−). The assessments specified were made when at least 4 of the 5 test specimens met the criteria mentioned. The corresponding results are likewise listed in table 2.

TABLE 2

Results of the respective test specimens after water storage

| Test specimen | Water absorption [in % by wt.] | Thickness swelling [in %] | Embossability |
|---|---|---|---|
| FVD1 | 73 | 33 | + |
| FVP1 | 23 | 12 | − |
| FVM1 | 24 | 13 | − |
| FVE1 | 27 | 14 | − |
| FEP1 | 28 | 13 | + |
| FEM1 | 26 | 14 | + |
| FEE1 | 26 | 14 | + |

It is clearly apparent from the results that the test specimens consolidated with dispersion 1 alone did have good embossability, but had high water absorption and high thickness swelling, whereas the test specimens consolidated solely with a di- or polyisocyanate had low water absorption and low thickness swelling, but inadequate embossability. By contrast, the test specimens consolidated both with dispersion 1 and with a di- or polyisocyanate had both good embossability and low water absorption, and also low thickness swelling.

The invention claimed is:

1. A process for producing a thermoformable polymer/fiber composite using a fibrous substrate, an organic di- or polyisocyanate compound I and a polymer P, where the fibrous substrate is introduced into a gas stream, then the fibrous substrate in the gas stream is contacted with an aqueous dispersion of a polymer P having a glass transition temperature Tg and an organic di- or polyisocyanate compound I, then the fibrous substrate that has been contacted with the aqueous dispersion of the polymer P and the organic di- or polyisocyanate compound I is dried in the gas stream and then deposited, then the deposited fibrous substrate obtained is converted to a fiber web, and then the fiber web obtained is consolidated at a temperature ≥Tg to give a thermoformable polymer/fiber composite, which comprises effecting the aqueous dispersion of the polymer P by free-radically initiated emulsion polymerization of a mixture of ethylenically unsaturated monomers P [monomers P] in an aqueous medium in the presence of a polymer A, where the polymer A is formed from a) 80% to 100% by weight of at least one ethylenically unsaturated mono- and/or dicarboxylic acid [monomers A1] and b) 0% to 20% by weight of at least one further ethylenically unsaturated monomer which differs from the monomers A1 [monomers A2], in copolymerized form, and where the monomers P are chosen in terms of type and amount such that the polymer P obtained has a glass transition temperature Tg≥20° C. measured according to DIN EN ISO 11357-2 (2013-09).

2. The process according to claim 1, wherein the weight ratio of polymer P to polymer A is ≥1 and ≤10.

3. The process according to claim 1, wherein the polymer A has a number-average molecular weight of ≥1000 and ≤30 000 g/mol.

4. The process according to claim 1, wherein the polymer P is prepared using

| ≥90% and ≤99.9% by weight of | styrene and/or methyl methacrylate, |
| ≥0% and ≤9.9% by weight of | n-butyl acrylate and/or 2-ethylhexyl acrylate, and |
| ≥0.1% and ≤10.0% by weight of | acrylic acid, methacrylic acid, glycidyl acrylate, glycidyl methacrylate, 2-hydroxyethyl, 2-hydroxypropyl and 3-hydroxypropyl acrylate and methacrylate, 2-aminoethyl, 2-aminopropyl and 3-aminopropyl acrylate and methacrylate, butylene 1,4-glycol diacrylate and -methacrylate, 1,2-, 1,3- and 1,4-divinylbenzene, allyl acrylate and/or allyl methacrylate, | where the amounts add up to 100% by weight.

5. The process according to claim 1, wherein the organic di- or polyisocyanate compound I is an aromatic di- or polyisocyanate compound.

6. The process according to claim 1, wherein the organic di- or polyisocyanate compound I is diphenylmethane 2,2'-diisocyanate (2,2'-MDI), diphenylmethane 2,4'-diisocyanate (2,4'-MDI), diphenylmethane 4,4'-diisocyanate (4,4'-MDI) and/or oligomeric diphenylmethane diisocyanate.

7. The process according to claim 1, wherein the fibrous substrate used is a natural fiber.

8. The process according to claim 1, wherein the fibrous substrate is contacted in the gas flow direction first with the aqueous dispersion of the polymer P and only then with the organic di- or polyisocyanate compound I.

9. The process according to claim 1, wherein the amount of polymer P is 0.1% to 15% by weight and the amount of organic di- or polyisocyanate compound I is 0.1% to 10% by weight, based in each case on the amount of the fibrous substrate.

10. The process according to claim 1, wherein the resultant thermoformable polymer/fiber composite is two-dimensional and has a basis weight of ≥500 and ≤30 000 g/m$^2$.

11. A thermoformable polymer/fiber composite obtained by the process according to claim 1.

12. A method comprising providing the thermoformable polymer/fiber composite according to claim 11 and producing a polymer/fiber molding which differs in shape from the thermoformable polymer/fiber composite used.

13. A process for producing a polymer/fiber molding, which comprises heating a thermoformable polymer/fiber composite according to claim 11 up to a temperature ≥Tg, converting the polymer/fiber composite thus obtained at a temperature ≥Tg to the desired shape of the polymer/fiber molding and then cooling the polymer/fiber molding obtained down to a temperature <Tg while retaining its shape.

14. The process for producing a polymer/fiber molding according to claim 13, wherein the operation of heating the polymer/fiber composite is effected by means of passage between two metal rolls in an axially parallel arrangement that rotate in the direction of passage, wherein
   a) at least one of the metal rolls has a defined surface structure of the contact surface to the polymer/fiber composite and a temperature ≥Tg,
   b) the gap between the contact surfaces of the two metal rolls is less than the thickness of the polymer/fiber composite, and
   c) the passage of the polymer/fiber composite between the contact surfaces of the two metal rolls is at the speed corresponding to the speed of rotation of the contact surfaces of the two metal rolls.

15. The process according to claim 14, wherein the heating step is preceded or followed by application of a two-dimensional decorative material to the polymer/fiber composite.

16. A polymer/fiber molding obtained by the process according to claim 13.

17. A method comprising providing the polymer/fiber molding according to claim 16 and preparing a floor covering, furniture molding or wall decor part.

* * * * *